United States Patent [19]

Wilson et al.

[11] Patent Number: 4,812,377
[45] Date of Patent: Mar. 14, 1989

[54] HIGH RESOLUTION POLYESTER DEVELOPERS FOR ELECTROSTATOGRAPHY

[75] Inventors: John C. Wilson, Rochester; Domenic Santilli, Webster; Lawrence P. DeMejo, Rochester, all of N.Y.

[73] Assignee: Eastman Kodak Company, Rochester, N.Y.

[21] Appl. No.: 173,901

[22] Filed: Mar. 28, 1988

[51] Int. Cl.$^4$ .......................... G03G 9/08; G03G 9/12
[52] U.S. Cl. .................................. 430/109; 430/106.6; 430/110; 430/114; 430/115; 528/274; 528/289
[58] Field of Search ................. 430/109, 105, 114; 528/274, 289

[56] References Cited

U.S. PATENT DOCUMENTS

| | | |
|---|---|---|
| 4,140,644 | 2/1979 | Sandhu et al. |
| 4,217,440 | 8/1980 | Barkey. |
| 4,388,395 | 6/1983 | Tsubuko et al. |
| 4,579,803 | 4/1986 | Kato et al. |
| 4,645,802 | 2/1987 | Jackson et al. |
| 4,686,166 | 8/1987 | Kumagai et al. ................... 430/109 |

FOREIGN PATENT DOCUMENTS 62-81643 4/1987 Japan ................................. 430/109
62-85258 4/1987 Japan ................................. 430/109

OTHER PUBLICATIONS

Derwent Abstract 75309E/36 (JP007939, published Jul. 30, 1982).
Abstract of Japanese Kokai 59-204051, published Nov. 19, 1984 (from Patent Abstract of Japan).

Primary Examiner—Roland E. Martin
Assistant Examiner—Jeffrey A. Lindeman
Attorney, Agent, or Firm—Bernard D. Wiese

[57] ABSTRACT

Dry or liquid developers capable of forming high resolution electrostatographic images are made from finely divided toner particles comprising a fusible branched chain, polyester resin which contains 2,3-dihydro,1,3-dioxo-2-yl-1H-isoindole-ar(-yl or -diyl) groups derived, for example, from a 2,3-dihydro-1,3-dioxo-1H-isoindole-5-carboxylic acid. The toner compositions are brittle and can be ground to very small particle size for high resolution image development; they have good cohesivity and resist toner offset; they are fusible at low temperatures; and, in preferred embodiments, are capable of forming transparent color images.

16 Claims, No Drawings

HIGH RESOLUTION POLYESTER DEVELOPERS FOR ELECTROSTATOGRAPHY

FIELD OF THE INVENTION

This invention relates to electrostatography and more particularly to developer compositions capable of forming images with a high degree of resolution.

BACKGROUND OF THE INVENTION

In electrostatographic imaging processes, a charge pattern latent image is formed on a photoconductive surface and then is developed on that surface, or on another surface to which the charge pattern is transferred, by contact with finely divided, oppositely charged toner particles. The toner can be applied by means of a liquid developer, which is a colloidal suspension of polymeric toner particles in a volatile carrier liquid or by means of a dry developer which is a physical mixture of relatively large carrier particles (magnetic carrier particles being used in the well-known magnetic brush method of development) and of smaller polymeric toner particles.

The polymer of which the toner particles are made must meet exacting requirements in order to form images of high quality. For instance, the toner particles must be very small in order to develop the image with a high degree of resolution of fine details. The toner polymer must fuse at a reasonably low temperature in order to facilitate the fixing of the toner image to paper or other receiver sheets by means of heated fusing rolls. The polymer must also have a high degree of melt cohesive strength in order to avoid the image defect known as "hot offset." This occurs in electrophotographic copying machines which use a heated fusing roll to fix the toner image to a paper sheet or other receiver sheet after transfer from the photoconductive surface. Unless the toner polymer has sufficient melt cohesive strength, some of it will stick to the fusing roll during the fusing step and will transfer to a subsequent sheet of paper, thus forming on it an "offset" or "ghost" image in addition to the desired one.

In order to grind a toner polymer to a small particle size as required for development of images with a high degree of resolution, the polymer must be brittle. In other words, it must have a high degree of grindability. Many polymers which would otherwise be useful as toners cannot be ground easily to very small sizes and hence are not suitable for making high-resolution toners.

Still further, toners to be used in color imaging processes, which use the subtractive principle of color reproduction with combinations of toners of three or four different colors, must be transparent to all but certain wavelengths of light. This rules out a number of otherwise satisfactory polymers which are hazy or are otherwise inadequately transparent.

A need has existed, therefore, for an improved toner composition, made from a polymer which can be ground easily to a very small particle size, which has sufficient cohesivity to resist hot offset in the fusing step, which can be fixed to the receiver by fusion at low temperature, and which is transparent to selected wavelengths of light when fused on the receiver sheet.

BRIEF SUMMARY OF THE INVENTION

In accordance with the present invention, a novel developer composition is provided which possesses the unusual but desired combination of qualities indicated above. The new developer composition contains particles of toner which comprise an amorphous fusible polymer and, optionally, a colorant and a charge control agent. The polymer is a branched chain polyester resin, preferably having an inherent viscosity of 0.2 to 0.8 at 25° C. in dichloromethane solution, at 0.25 g/100 ml of solution, and contains branching groups and 2,3-dihydro-1,3-dioxo-2-yl-1H-isoindole-ar(-yl or -diyl) groups, as chain capping or as backbone groups of the polyester, in sufficient concentration to make the polyester resin grindable to fine particle size. Preferred polyesters are of the formula:

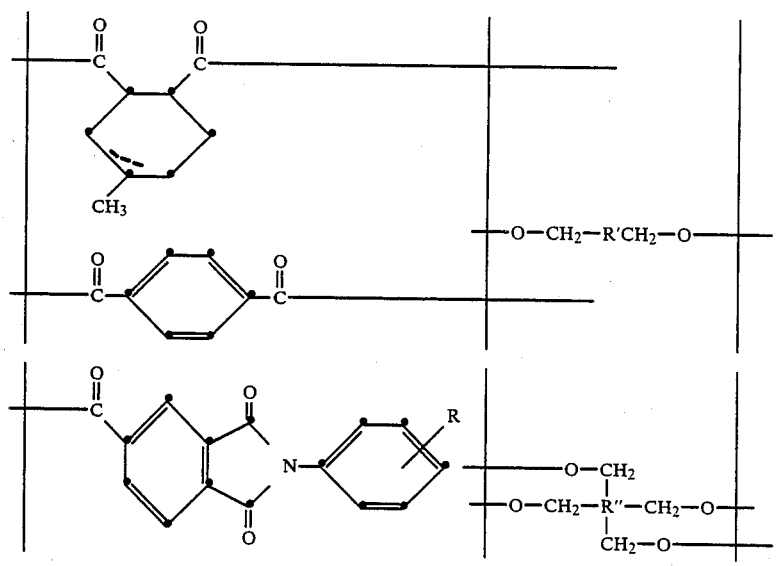

wherein R is hydrogen or carbonyl; R' is a single bond or a lower alkylene group, e.g., —C(CH$_3$)$_2$— or —CH(CH$_3$)—; and R" is a tetravalent lower aliphatic group, e.g.,

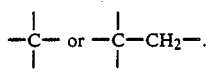

Such preferred polyesters further can contain sulfoisophthalic and aliphatic triol components as follows:

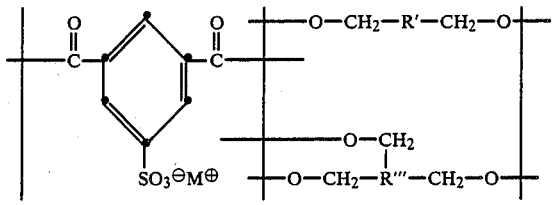

wherein $M^\oplus$ is a cation, e.g., $Na^\oplus$; and $R'''$ is a trivalent lower aliphatic hydrocarbon group, e.g.,

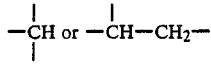

and $R'$ is a single bond or a lower alkylene group, e.g., $—C(CH_3)_2—$ or $—CH(CH_3)—$.

DETAILED DESCRIPTION

The polyesters for the toner compositions are made by polymerization of polyester monomers, i.e., dicarboxylic acids and diols (or their functional equivalents) which yield polyesters that have good fusing properties. Reacted with these usual types of polyester monomers are monomers that contain 2,3-dihydro-1,3-dioxo-2-yl-1H-isoindole-ar(-yl or -diyl) groups, the latter monomers being functionalized with ester-forming groups, e.g., carboxy, hydroxy, or alkoxycarbonyl.

Suitable dicarboxylic monomers include a wide range of dicarboxylic acids, by which term is included functional equivalents such as anhydrides, esters and acid halides. Examples of suitable dicarboxylic acids include: terephthalic acid, isophthalic acid, sulfoisophthalic acid, and glutaric acid. Examples of useful diols include: ethylene glycol, 1,2-propanediol, neopentyl glycol, and 1,4-cyclohexanedimethanol. Also useful are polyfunctional compounds having one or more carboxyl groups and one or more hydroxyl groups.

To create branching in the polyester chain the polyester monomers include various polyols, e.g., triols and tetraols, or polyacids. Examples of these include: pentaerythritol, trimethylolpropane, trimellitic anhydride, pyromellitic dianhydride, etc. A minor portion of the reaction mixture, e.g., up to about 10 mole percent, should be a compound having three or more hydroxyl or carboxyl groups. This provides the desired degree of branching.

As already indicated, the polyesterification reaction mixture also includes one or more functionally terminated reactants containing 2,3-dihydro-1,3-dioxo-2-yl-1H-isoindole-ar(-yl or -diyl) groups. These include compounds having a single esterification functional group to provide terminal 2,3-dihydro-1,3-dioxo-2-yl-1H-isoindole-ar(-yl or -diyl) moieties, or di functional groups to incorporate the 2,3-dihydro-1,3-dioxo-2-yl-1H-isoindole-ar(-yl or -diyl) containing groups in the polymer chain, or tri-functional groups to cause chain branching. These compounds are of the general formula:

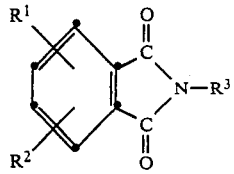

In this general formula $R^1$ and $R^2$, taken singly, can be hydrogen or functional groups which lead to esters such as carboxy or carboxyalkyl. Also when one of $R^1$ or $R^2$ is hydrogen the other can be

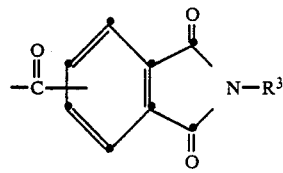

wherein $R^3$ is aryl such as phenyl; alkyl such as ethyl; hydroxyalkyl such as hydroxyethyl; hydroxyaryl such as hydroxyphenyl; carboxyalkyl or carboxyaryl such as 2-carboxyethyl or 4-carboxyphenyl. Furthermore, $R^3$ can be

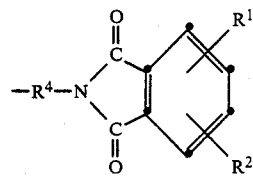

wherein $R^4$ is arylene such as 1,4-phenylene or alkylene such as 1,2-ethylene or cycloalkylene dialkylene such as 1,4-cyclohexane dimethylene.

In addition, when taken together, $R^1$ and $R^2$ are

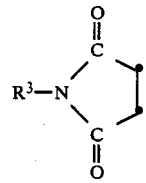

wherein $R^3$ is as defined above and the carbonyl carbons are bonded to the 5,6-carbon atoms, respectively, of the isoindole nucleus.

In any event, at least one of $R^1$, $R^2$ or $R^3$ is a functionalized group capable of entering into an esterification reaction.

Examples of such compounds include: 2,3-dihydro-1,3-dioxo-2phenyl-1H-isoindole-5-carboxylic acid; 2,3-dihydro-1,3-dioxo-2-(4-carboxyphenyl)-1H-isoindole-5-carboxylic acid; 2,3-dihydro-1,3-dioxo-2-(3-carboxyphenyl)-1H-isoindole-5-carboxylic acid; 2,3-dihydro-1,3-dioxo-2-(4-carboxyphenyl)-1H-isoindole; 2,2'-(1,3-phenylene)bis(2,3-dihydro-1,3-dioxo-1H-isoindole-5-carboxylic acid); 2,2'-(1,4-phenylene)bis(2,3-dihydro-1,3-dioxo-1H-isoindole-5-carboxylic acid); 2,2'-(1,6-hexamethylene)bis(2,3-dihydro-1,3-dioxo-1H-isoindole-5-carboxylic acid); 2,2'-(1,2-ethylene)bis(2,3-dihydro-1,3-dioxo-1H-isoindole-5-carboxylic acid); 2,2'-(1,4-cyclohexylene dimethylene)bis(2,3-dihydro-1,3-dioxo-1H-isoindole-5-carboxylic acid); 2,6-bis-(2-hydroxyethyl)benzo[1,2-c:4',5'-c']-dipyrrole-1,3,5,7-(2H, 6H)tetrone; 2,6-bis(3-hydroxypropyl)benzo[1,2-c:4',5'-c']-dipyrrole-1,3,5,7-(2H, 6H)tetrone; 2,6-bis(4-carboxyphenyl)benzo[1,2-c:4',5'-c']-dipyrrole-1,3,5,7-(2H,6H)-tetrone; 5,5'-carbonylbis(2,3-dihydro-1,3-dioxo-2-(2-hydroxyethyl)-1H-isoindole).

The preferred brittle polyesters are derivatives of at least one aromatic dicarboxylic acid, at least one aliphatic diol, at least one aliphatic triol or tetraol branching agent and one or more compounds which provide the indicated isoindole dione groups. Preferably, the latter compounds are of the formula:

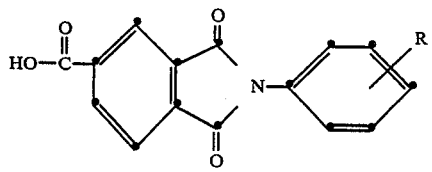

wherein R is hydrogen or carboxyl. When R is hydrogen the isoindole dione groups are chain capping groups and when R is carboxyl they are primarily in the backbone of the polyester.

The branched polyester resins for the developer compositions of the invention can be prepared by known two-stage polyesterification procedures such as described in the patent to Sandhu et al., U.S. Pat. No. 4,140,644, and the patent to Barkey, U.S. Pat. No. 4,217,400, the latter being especially directed to the control of branching in polyesterification. The glycols and diacids or their esterification equivalents are heated with the branching agent, e.g., a triol, triacid or their equivalents, and a transesterification catalyst in an inert atmosphere. Suitable temperatures are in the range from about 190° to 280° C. and preferably are from about 200° to 260° C. Thereafter a vacuum is applied and heating is continued, e.g., at 220°–240° C., to build up the molecular weight.

The degree of polyesterification can be monitored by measuring the inherent viscosity (iv) of samples taken periodically. The inherent viscosity of the resin should be for dry/liquid developers, at least about 0.1/0.08 and preferably in the range from about 0.4/0.1 to 0.8/0.5 when measured at a concentration of 0.25 g/dl at 25° C. in dichloromethane. After reaching the desired IV, the polyester is cooled and isolated for subsequent melt blending and grinding.

The resulting solid polymer is crushed and then melt blended in heated compounding rolls with a colorant, a charge control agent and any other desired addenda. After cooling and solidifying the blended composition, it is crushed and then coarsely ground in a mechanical mill. Thereafter, the coarsely ground composition is pulverized or ground to the desired small toner particle size. One suitable means is a fluid energy mill such as described in the patent to Siegel et. al., U.S. Pat. No. 4,089,472. If a liquid or dry developer is desired, the pulverized toner is mixed in appropriate ratios with a carrier liquid or with solid carrier particles. The toner can also be used as a single component developer without the need for such additional carriers.

An important advantage of the polyester resins used in the compositions of the invention is that, because of their brittleness, the toner composition, of which the polyester binder resin is the major component, can be ground to very small particle size. The brittleness also facilitates the crushing and coarse grinding procedure that usually precede the fine grinding operation. The latter, as indicated above, can be carried out in a fluid energy or air jet mill as in U.S. Pat. No. 4,089,472, although other methods and apparatus for finely grinding brittle resins can also be used.

The particle size of toners made from the described resins can be extremely small, e.g., of the order of 0.01 μm average diameter, as used in the powder cloud development process described in U.S. Pat. No. 2,691,345 of Oct. 12, 1954. Of more interest, however, are toners having an average particle size from about 0.1 to 30 μm. Toners within this size range can be employed in either liquid or dry developer in accordance with the invention. Liquid toners of volume average particle size less than 1 μm and dry toners of volume average particle size less than 15 μm are especially useful in accordance with the invention. It is also possible to use toners in accordance with the invention of much larger average particle size although the greatest advantages of the new compositions are realized in preparing smaller articles. In any event, the brittle polyesters described herein can be ground to the selected particle size with a low expenditure of energy.

To mix the polyester with toner components such as colorants and charge control agents, the preferred procedure is melt blending. This is done by crushing or coarsely grinding the solid polymer and melting it on heated compounding rolls. The addenda are included in the mixture, which is blended on the rolls until a uniform composition is obtained. In this composition the resin is the major component, that is, it comprises more than 50 percent by weight of the composition and preferably from about 75 to 98 percent. The minor components include the colorant and the charge control agent. The colorant can be selected from a wide range of pigments and dyes. For black toners, carbon black is a preferred pigment. Useful colorants for either black or colored toners are described in many patents. See for example U.S. Pat. Nos. 4,140,644; 4,416,965; 4,414,152; and 2,229,513. The concentration of colorant in the toner can vary over a wide range, for example, from about 0.5 to 20 weight percent with the range from about 1 to 6 weight percent being preferred.

Much of what is said above regarding the preparation of toners applies to toners for use in dry developer compositions. As for liquid developers, they comprise a dispersion of the polyester resin and addenda in an electrically insulating carrier liquid. Possible addenda include colorants, charge control agents, stabilizing agents and waxes. Such addenda and methods of incorporating them in developers are described in U.S. Pat. Nos. 3,849,165; 4,229,513; 3,788,995; 4,415,299; and 4,659,640.

A method of preparing such a dispersion is by milling in a solvent, e.g. Isopar G ™. A quantity of the resin is melt compounded on a two roll mill with colorants and other addenda. The resultant thermoplastic toner is pulverized on a Wiley-Mill ™ to less than 1 mm. This pulverized toner is then ballmilled with dispersing aids, e.g. those described in U.S. Pat. No. 4,659,640 to form a concentrate of toner particles having a volume average particle size, preferably of less than 1 micrometer. A liquid developer is made by dispersing the toner concentrate in a volatile carrier liquid. The carrier liquid has a low dielectric constant, e.g., less than about 2.5, and a high electrical resistance, e.g., a volume resistivity greater than about $10^{10}$ ohm-cm. Suitable carrier liquids include halogenated hydrocarbons such as trichloromonofluoromethane; hydrocarbons such as isoparaffins boiling from about 145° to 185° C., such as Isopar G liquid of Exxon Corp. or cyclic hydrocarbons such as cyclohexane; odorless mineral spirits, octane and the like.

Other addenda for dry toners include charge control agents, these usually being ionic compounds such as ammonium or phosphonium salts. Examples of suitable charge control agents are disclosed in U.S. Pats. Nos. 3,895,935; 4,079,014; and 4,323,634 and British Patent Nos. 1,501,065 and 1,420,839. Only a small concentration of charge control agent normally is used in the toner composition, e.g., from about 0.05 to 5 weight percent and preferably from 0.3 to 2.0 weight percent.

The toner and developer compositions of the invention are referred to as electrostatographic compositions. This means that they are not limited to use in electrophotographic processes but can develop images in processes not requiring the use of light sensitive materials, e.g., as in dielectric recording. They are especially useful, however, for developing charge patterns on photoconductive surfaces or on receiver sheets, such as paper, to which a charge pattern is transferred from a photoconductor. The photoconductive surfaces can be of any type, e.g., inorganic photoconductors such as selenium drums and paper coated with a zinc oxide composition or organic photoconductors such as disclosed in the patents to Light, U.S. Pat. No. 3,615,414 and Berwick et. al., U.S. Pat. No. 4,175,960.

Although the dry developer compositions of the invention are useful in all methods of dry development, including magnetic brush development, cascade development and powder cloud development, they are especially suitable for use in the magnetic brush method which employs a so-called two-component developer. This is a physical mixture of magnetic carrier particles and of finely divided toner particles. The magnetic particles are magnetic materials such as iron, iron alloys, ferrites and the like which can be thinly or partially coated with a small amount, e.g., 1 pph, of a polymer such as a fluorinated hydrocarbon resin to provide desired triboelectric properties. Usually the carrier particles are of larger size than the toner particles, although in certain new and preferred developers the carrier particles are of about the same size as the toner particles. Examples of useful carriers are disclosed in the patents to McCabe, U.S. Pat. No. 3,795,617; Kasper, U.S. Pat. Nos. 3,795,618 and 4,076,857; and Miskinis et. al., U.S. Pat. No. 4,546,060.

Further understanding of the invention is provided by the examples which follow. They illustrate compositions of the invention and also provide comparisons with other compositions of which the polyester toner resin contains no 2,3-dihydro-1,3-dioxo-2-yl-1H-isoindole-ar(-yl or -diyl) groups.

EXAMPLE 1

Synthesis of

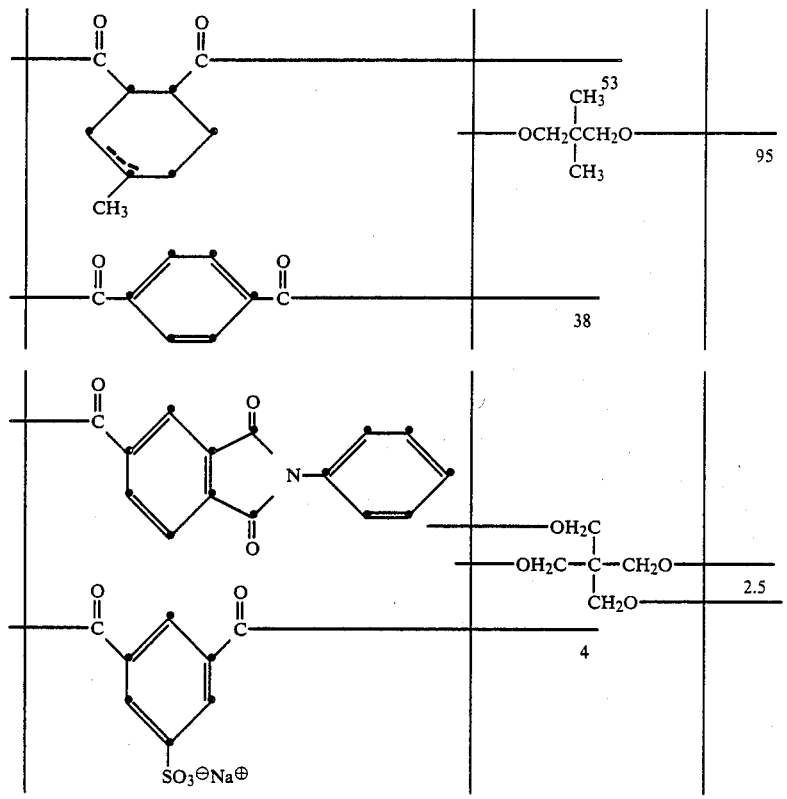

In a 500 ml polymer flask with an open sidearm was placed a mixture of 11.8 g (0.04 mol) of 5-sodio-sulfoisophthalic acid dimethyl ester, 138.5 g (1.33 mol) of neopentylglycol, and 3.40 g (0.025 mol) of pentaerythritol which was melted at 220° C. under $N_2$. Tetraisopropylorthotitanate (10 drops) was added and reacted until a hazy solution resulted. Then was added to the flask 88.0 g (0.53 mol) of methyltetrahydrophthalic anhydride, 73.8 g (0.38 mol) terephthalic acid dimethyl ester, 26.7 g (0.10 mol) of 2,3-dihydro-1,3-dioxo-2 phenyl-1H-isoindole-5-carboxylic acid and reacted for 2 hr at 220° C. and 1 hr at 240° C. The mixture was placed under vacuum (0.1 mm Hg) for approximately 1½ hrs. The flask was clamped off, and the polymer allowed to cool. IV (dichloromethane)=0.09; Tg=48.3° C.

EXAMPLE 2

This example illustrates the utility of small particle size toners in liquid electrographic developers, exhibiting improved resolution of the developed images. Branched polyesters comprising the 2,3-dihydro-1,3-dioxo-2-yl-1H-isoindole-ar(-yl or -diyl) groups according to this invention, were compared with non branched polyesters with and without the 2,3-dihydro-1,3-dioxo-2-yl-1H-isoindole-ar(-yl or -diyl) groups, as well as branched polyesters with no 2,3-dihydro-1,3-dioxo-2-yl-1H-isoindole-ar(-yl or -diyl) groups present.

The formulations for the electrophotographic liquid developers A–F were as follows, with the indicated variations in the polyester resin:

36.0 g. polyester resin
9.0 g. Epolene E12 low m.w. polyethylene (Eastman Chemicals)
9.0 g. Elvax 210 ethylene/vinyl acetate copolymer (Dupont)
14.4 g. carbon black (Regal 300 of Cabot Corp.)
3.6 g. Alkali Blue 6155 pigment (BASF)

Developer A: The polyester resin, which contained no 2,3-dihydro-1,3-dioxo-2-yl-1H-isoindole-ar(-yl or -diyl) group and no branching, was of the following composition:

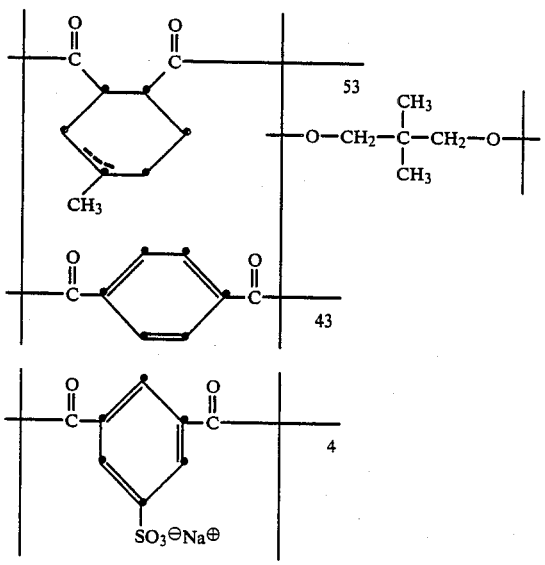

Developer B: Same as Developer A, except that the polyester resin further contained a pentaerythritol branching monomer 2.5, as follows:

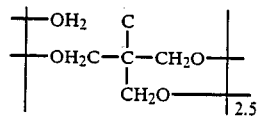

for a monomer mole ratio of neopentylglycol/pentaerythritol of 95/2.5.

Developer C: Same as Developer A, except that the polyester further contained 2,3-dihydro-1,3-dioxo-2-yl-1H-isoindole-ar(-yl or -diyl) groups (10) as follows:

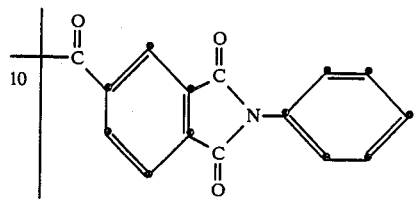

for a mole ratio of 53/33/10/4 of monomers, methyltetrahydrophthalic anhydride (MTPA)/dimethylterephthalate (DMT)/2,3-dihydro-1,3-dioxo-2-phenyl-1H-isoindole-5-carboxylic acid (ISI-1)/dimethylsodiosulfoisophthalate (DMSI).

Developer D: Same as Developer A, except that the polyester further contained 2,3-dihydro-1,3-dioxo-2-yl-1H-isoindole-ar(-yl or -diyl) groups (10) as follows:

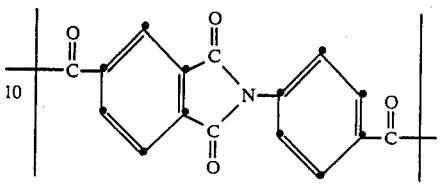

for a mole ratio of 53/33/10/4 of monomers, (MTPA/DTM/2,3-dihydro-1,3-dioxo-2-(4-carboxyphenyl)-1H-isoindole-5-carboxylic acid (ISI-2)/DMSI).

Developer E: Same as Developer C, except that pentaerythritol branching monomer, (2.5), is added to the polyester resin (neopentylglycol/pentaerythritol 95/2.5).

Developer F: Same as Developer D, except that pentaerythritol branching monomer, (2.5), is added to the polyester resin (neopentylglycol/pentaerythritol 95/2.5).

The polyester resin was melt compounded with the colorants and the other addenda.

Each resultant toner formulation was ground to 1 mm. This dry toner (10 g.) was added to 78.8 g poly(t-butylstyrene-co-styrene-co-lithiumsulfoethyl methacrylate) as 12.69% Isopar G ™ solution and ballmilled for 5 days. Poly(t-butyl styrene-co-lithium methacrylate) (3.0 g) was added and the mixture milled for an additional day. 8.9 g of the milled concentrate was diluted in 473 cc of Isopar G ™ carrier liquid and sheared ultrasonically for 20 sec. to form a working developer. Particle size of the toners and resolution of images formed by development of electrostatic latent images on a single use, homogeneous photoconductive film, were measured by an optical microscope. Results are listed in Table I below:

TABLE I

| Developer | 2,3-dihydro-1,3-dioxo-2-yl-1H—isoindole-5-yl group | Branches | Particle Size (μm) | Resolution (lines/mm) |
| --- | --- | --- | --- | --- |
| A (control) | none | none | <1+ few 1.5 | ≦200 |
| B (control) | none | yes | <1+ few 1.0 | 200–250 |
| C (control) | yes | none | <1+ few 1.0 | 200–250 |
| D (control) | yes | none | <1+ few 1.0 | 200–250 |
| E | yes | yes | <1 | 300 |
| F | yes | yes | <1 | 300 |

The above data show that:

(a) Branching alone without 1H-isoindole-1,3-(2H)-dione monomers provides slightly higher resolution relative to the control, but some larger particles remain.

(b) Presence of 2,3-dihydro-1,3-dioxo-2-yl-1H-isoindole ar(-yl or -diyl) groups shows similar higher resolution above, but particle size includes particles up to 1 μm.

(c) Combination of branching and presence of 2,3-dihydro-1,3-dioxo-2-yl-1H-isoindole-ar(-yl or -diyl) group significantly improves in both resolution and particle size (all less than 1 μm).

EXAMPLE 3

This example illustrates improvement in toner particle size utilizing branched 2,3-dihydro-1,3-dioxo-2-yl-1H-isoindole-ar(-yl or -diyl) containing polyesters of this invention over branched non-imide-containing polyesters in electrographic dry developers. Toners containing 1.5 parts of a phosphonium charge agent and 6 parts of Regal 300 ™ carbon black were formulated with 100 parts of binder polymers of this invention or a standard binder as a control.

First, the compounded toner formulations were coarse ground, then 25 g. of each were fed into an air jet mill at equivalent feed rate and air pressure settings. (Feed=0.5 g/min, grind pressure=70 psi, initial feed 25 g). The resulting volume average particle size quantifies the brittleness characteristics of each toner for a given yield since the same amount of energy was applied to the same weight or volume of each feed material.

Volume average diameter particle sizes were measured by the HIAC particle Size Analyzer manufactured by pacific Scientific Company of Menlo Park, Calif. and described in "Direct Characterization of Fine Particles" by B. Kaye, pages 288–290, published by John Wiley & Sons, Inc., New York, N.Y., 1981. The "volume diameter" of an irregular particle size is equated to the diameter of a sphere having the same volume as the particle. (see "Particle Size Measurements" by T. Allen, pages 75 and 89, published by John Wiley & Sons, Inc., New York, N.Y., 1974.)

Colorant and charge agent were compounded at 120° C. (160° C. for Toner B) with the binder polymer, and ground as above. Particle size of each toner was measured as above. Particle size measurements are listed in Table II.

Polymer binders:

A. Control

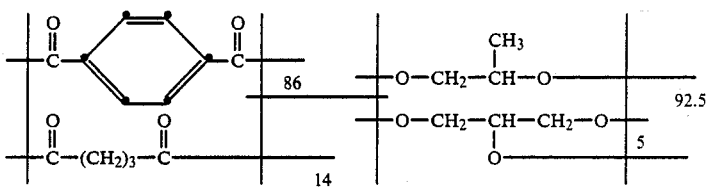

B. Control

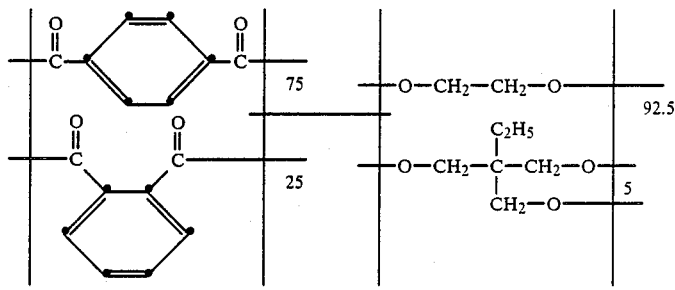

C. Same as Binder B, except that the monomer,

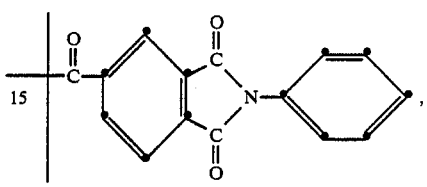

was added for ratio of the acid monomers of 67.5/25/15 for DMT/phthalic anhydride (PA)/ISI-1.

D. Same as Binder B, except that the monomer,

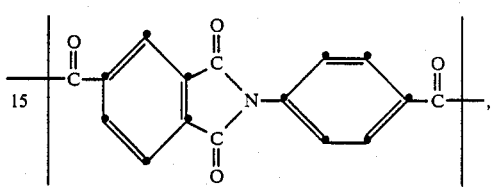

was added for a ratio of the acid monomers of 60/25/15 for DMT/PA/ISI-2.

TABLE II

| Polymer/Toner | Polymer IV (dl/g) | Polymer Tg (°C.) | Polymer V̄ (μm) | Toner V̄ (μm) |
|---|---|---|---|---|
| A | 0.69 | 63.5 | 14.1 | 13.5 |
| B | 0.77 | 59.5 | 12.8 | 13.4 |
| C | 0.48 | 70 | 11.4 | 9.9 |
| D | 0.62 | 68 | 11.3 | 11.7 |

IV is inherent viscosity in deciliters/gram.
V is volume average particle size in micrometers.

These data show that the toners of Examples C and D which are for use in the developer compositions of this invention have lower particle sizes than the controls when ground in an air jet with the same energy expenditure.

The invention has been described in detail with particular reference to preferred embodiments thereof, but it will be understood that variations and modifications can be effected within the spirit and scope of the invention.

We claim:

1. An electrostatographic toner composition comprising an amorphous fusible polyester resin, said resin being a branched chain polyester containing 2,3-dihydro-1,3-dioxo-2-yl-1H isoindole-ar(-yl or -diyl) groups in sufficient concentration to make the polyester resin grindable to fine particle size.

2. A composition according to claim 1 in the form of toner particles having a volume average particle size less than 0.1 micrometer.

3. A composition according to claim 1 wherein the 2,3-dihydro-1,3-dioxo-2-yl-1H-isoindole-ar(-yl or -diyl) groups are in a chain capping group of the polyester.

4. A composition according to claim 1 wherein the 2,3-dihydro-1,3-dioxo-2-yl-1H-isoindole-ar(-yl or -diyl) groups are in the backbone of the polyester.

5. A composition according to claim 1 which also contains a charge control agent and a colorant.

6. A composition according to claim 3 wherein the 2,3-dihydro-1,3-dioxo-2-yl-1H-isoindole-ar(-yl or -diyl) chain capping groups are of the formula:

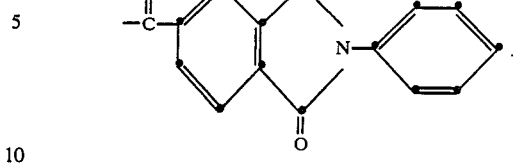

7. A composition according to claim 4 wherein the 2,3-dihydro-1,3-dioxo-2-yl-1H-isoindole-ar(-yl or -diyl) backbone groups are of the formula:

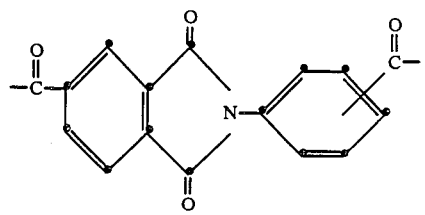

8. A composition according to claim 1 wherein the polyester is the derivative of at least one aromatic dicarboxylic acid, at least one aliphatic diol, at least one aliphatic triol or tetraol branching agent and of an isoindole compound of the formula:

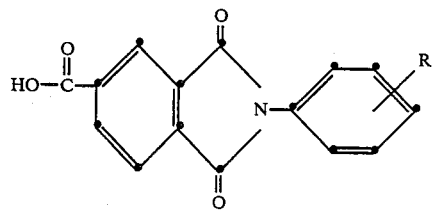

wherein R is hydrogen or carboxyl.

9. A composition according to claim 1 wherein the polyester comprises components of the formula:

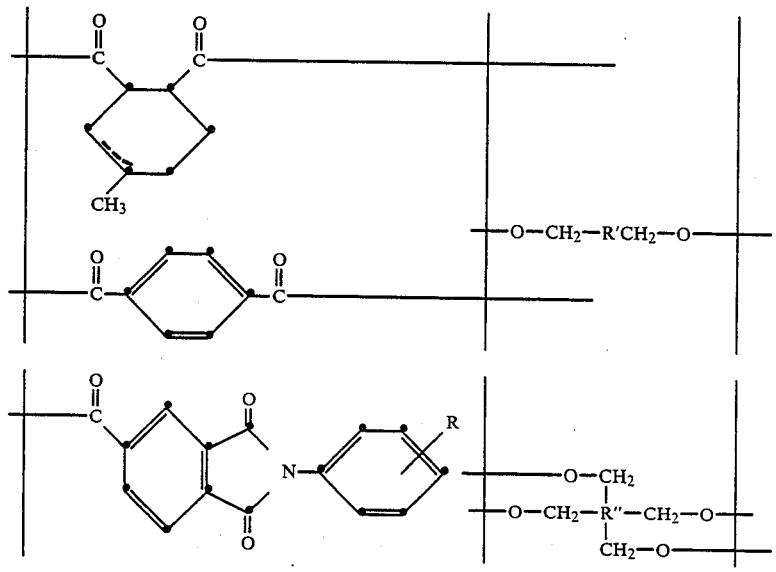

wherein R is hydrogen or carboxyl; R' is a single bond or lower alkylene; and R" is a tetravalent lower aliphatic hydrocarbon group.

10. A composition according to claim 9 wherein the polyester further comprises sulfoisophthalic and aliphatic triol components of the formula:

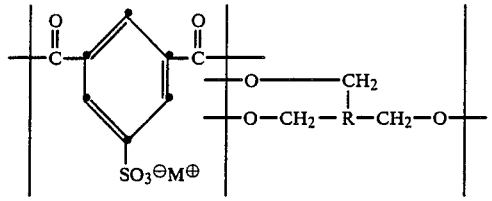

wherein M⊕ is a cation and R is a trivalent lower aliphatic hydrocarbon.

11. An electrostatographic developer composition comprising finely divided toner particles of the composition according to claim 1, said particles being admixed with solid carrier particles in a dry developer composition or dispersed in a carrier liquid in a liquid developer composition.

12. A dry developer composition according to claim 11 wherein the toner particles have a volume average particle size less than 15 micrometers and the carrier particles are magnetic particles.

13. A liquid developer composition according to claim 11 wherein the toner particles have a volume average particle size less than 0.1 micrometer and are dispersed in a volatile, electrically insulating carrier liquid.

14. A developer composition according to claim 11 wherein the 2,3-dihydro-1,3-dioxo-2-yl-1H-isoindole-ar(-yl or -diyl) groups are in a chain capping group of the polyester.

15. A developer composition according to claim 11 wherein the 2,3-dihydro-1,3-dioxo-2-yl-1H-isoindole-ar(-yl or -diyl) groups are in the backbone of the polyester.

16. A developer composition according to claim 11 wherein the toner particles also contain a charge control agent.

* * * * *